United States Patent
Akiyama et al.

(10) Patent No.: US 6,862,508 B2
(45) Date of Patent: Mar. 1, 2005

(54) VEHICLE DATA COMMUNICATION SYSTEM HAVING SUPERVISED COORDINATION OF NETWORKS WHICH CONTROL RESPECTIVE BASIC OPERATING FUNCTIONS OF VEHICLE

(75) Inventors: Susumu Akiyama, Kariya (JP); Tsutomu Tashiro, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/686,660

(22) Filed: Oct. 17, 2003

(65) Prior Publication Data

US 2004/0083044 A1 Apr. 29, 2004

(30) Foreign Application Priority Data

Oct. 18, 2002 (JP) ......................................... 2002-304571

(51) Int. Cl.[7] .............................................. G06F 17/00
(52) U.S. Cl. ........................................... 701/48; 701/36
(58) Field of Search ............................... 701/1, 36, 45, 701/48, 51; 709/208, 220, 238, 244, 253

(56) References Cited

U.S. PATENT DOCUMENTS

| | | | |
|---|---|---|---|
| 5,351,776 A | | 10/1994 | Keller et al. |
| 5,367,456 A | * | 11/1994 | Summerville et al. ........ 701/24 |
| 5,692,816 A | * | 12/1997 | Lai ........................... 312/334.4 |
| 6,154,688 A | | 11/2000 | Dominke et al. |
| 6,292,741 B1 | | 9/2001 | Bitzer et al. |
| 6,664,751 B1 | * | 12/2003 | Gabriel et al. .............. 318/599 |

FOREIGN PATENT DOCUMENTS

| | | |
|---|---|---|
| JP | 5-85228 | 4/1993 |
| JP | 10-250417 | 9/1998 |
| JP | 2000-71819 | 3/2000 |

* cited by examiner

Primary Examiner—Richard M. Camby
(74) Attorney, Agent, or Firm—Posz & Bethards, PLC

(57) ABSTRACT

A vehicle LAN is formed of networks of ECUs with each network controlling a specific basic system of the vehicle such as the power train, and each network including a supervisory ECU with the supervisory ECUs able to mutually communicate via a high-level communication line. Each supervisory ECU coordinates the control operations of its own network, based on status information from that network and on control requests transmitted from other networks, so that only small amounts of data need be transferred within the system.

4 Claims, 4 Drawing Sheets

VEHICLE DATA COMMUNICATION SYSTEM HAVING SUPERVISED COORDINATION OF NETWORKS WHICH CONTROL RESPECTIVE BASIC OPERATING FUNCTIONS OF VEHICLE

BACKGROUND OF THE INVENTION

1. Field of Application

The present invention relates to a communication system for transfer of data between ECUs (Electronic Control Units) of a vehicle and controlling various operating functions of the vehicle.

2. Description of Prior Art

In the prior art, due to increasingly stringent requirements for motor vehicles with respect to reduced fuel consumption, enhanced safety, greater ease of use, etc., automation of vehicle functions through use of electronic technology is increasing accordingly. There has thus been an increase in the numbers of ECUs which are incorporated for controlling the functions performed by various systems of a vehicle. In order to enable effective data communication between the various ECUs to achieve coordination of the control functions of these ECUs and for sharing of information between them, the ECUs are connected to communication lines, for mutual communication, such as to constitute a data communication network which is generally referred to as a vehicle LAN (Local Area Network).

Such a prior art type of vehicle LAN has generally been configured as illustrated in FIG. 4. This includes a control system network 100 formed of a set of ECUs connected to communication line La, i.e., an engine ECU 101 for controlling the operation of the vehicle engine, ACC (Adaptive Cruise Control) ECU 102 for controlling the vehicle such as to follow a preceding vehicle or to run at a specific fixed speed, an ECT (Electronically Controlled Transmission) 103 for controlling operation of the automatic transmission of the vehicle, and a brake ECU 104 for controlling the brakes of the vehicle. The vehicle LAN also includes an information system network 110 formed of a set of ECUs connected to communication line Lb, i.e., a navigation ECU 111 for controlling a vehicle navigation apparatus, an audio ECU 112 for controlling the audio equipment of the vehicle, and a telephone ECU 113 for controlling a telephone apparatus. The vehicle LAN also includes a body system network 120 formed of a set of ECUs connected to communication line Lc, i.e., a power source ECU 121 for managing the use of electrical power from the vehicle battery, a body ECU 122 which controls functions such as door locking/unlocking, etc., and a smart key ECU 123 which sends commands to the ECU 122 for performing door locking/unlocking, in response to signals transmitted by radio from an electronic key that is carried by the vehicle driver.

In that way, the various ECUs are grouped into respective categories, in accordance with the types of functions that they control.

In addition, a gateway ECU 130 is connected to each of the communication lines La, Lb, Lc for acting as an intermediary in data communication between the various networks. In that way, the ECUs of different networks can exchange data via the gateway ECU 130. Such a system is described for example in Japanese patent No. 5-85228 (FIG. 2), Japanese patent No. 10-250417 (FIG. 1) and Japanese patent No. 2000-71819 (FIG. 2).

However with such a prior art type of vehicle control system, the amount of data which must be transferred via the communication lines will become extremely large, so that in recent years it has become almost impossible for such a system to operate with high performance while providing the large number of functions that are required.

Specifically, with such a prior art type of vehicle control system, each ECU receives various types of data such as control information from a plurality of other ECUs, and thereby determines a degree of control that must be applied to a controlled apparatus and so determines a control quantity which must be used for that purpose, and performs control accordingly. Hence, in order for each of the ECUs to operate smoothly in a coordinated manner while effectively performing their various types of control, large amounts of data must frequently be exchanged between them, at high speeds of data transfer. For example with the prior art system of FIG. 4, in order for control of the engine and of the automatic transmission of the vehicle to be smoothly executed, certain information must be supplied from the engine ECU 101 to the ECT ECU 103. Such information includes the engine rotation speed, the degree of throttle opening, information indicating the engine torque, the ignition timing, information specifying when a fuel cut-off operation is in progress, the number of engine rotations since recovery from the fuel cut-off condition, the anticipated duration of a fuel cut-off interval, engine on/off information, etc. In addition the engine ECU 101 must send requests such as requests for inhibiting use of third gear, requests for inhibiting use of fourth gear, requests for release from lock-up, etc. Thus, not only is a large amount of data exchanged between ECUs that are within the same network, but also large amounts of data must be exchanged between the ECUs of different networks, as gateway data.

SUMMARY OF THE INVENTION

It is an objective of the present invention to overcome the problems of the prior art set out above, by providing a vehicle communication system whereby the amounts of data that must be exchanged between ECUs of the same network and between ECUs of respectively different networks which in combination constitute a vehicle LAN can be substantially reduced, and requirements for high speed of data transfer can be lowered.

To achieve the above objectives, the invention provides a vehicle communication system having respective data communication networks (referred to in the following simply as "networks") assigned to different basic systems of a vehicle, (such as the engine/transmission system which produces and supplies motive power to the road wheels), with each network formed of a plurality of ECUs linked by a dedicated communication line, and with one of the ECUs of each network being designed to function as a supervisory ECU for the other ECUs of that network. Specifically, the supervisory ECU transmits information and control target values to these other ECUs of its own network. Each supervisory ECU is connected to a high-level communication line, which is separate from the dedicated communication lines of the networks. Each supervisory ECU receives information from the other ECUs of its network via the dedicated communication line of that network, and also receives information via the high-level communication line, and derives information and control target values to be transmitted to the other ECUs of its own network based upon the information received via the high-level communication line and upon internal processing of received status information that is performed by the supervisory ECU itself.

With a preferred embodiment of the invention, an ECU is incorporated which is connected only to the high-level communication line, and which functions as a vehicle supervisory ECU for coordinating the control operations executed by the various networks. Each of the supervisory ECUs of the networks transmits to the vehicle supervisory ECU information relating to the operating status of its own network and information constituting requests for control operations to be implemented by other ones of the networks, and the vehicle supervisory ECU executes processing to mediate between the requests, based on the information relating to operating status. The results of such mediation are then transmitted to the various supervisory ECUs of the networks, as control values which constitute guidance objectives, i.e., which are to be taken into account by each supervisory ECUs of a network when calculating a target value of a parameter (such as output shaft torque, or supplied electrical power) that is to be achieved by the vehicle system (e.g., power train system, or electrical supply system) which is controlled by that network.

With such a vehicle communication system, in which each supervisory ECU performs supervisory control of its own network, each of the other ECUs of that network only transmit/received data to/from that supervisory ECU. Hence, the amounts of data which must be exchanged between the ECUs within each network are substantially smaller than the amounts of data which are transferred between the ECUs of a conventional type of vehicle LAN, in which each ECU that controls a part of a vehicle system must communicate with a number of other ECUs.

In addition, since each supervisory ECU of a network performs processing of the information received from the ECUs of its own network, to select information or requests which actually are required to be transmitted to other networks, the amount of data which are transmitted between the networks can also be substantially reduced by comparison with the prior art. Hence, the overall amount of data which is transmitted/received within the vehicle communication system can be made extremely low, so that a sufficiently high level of control performance can be achieved even of the data transmission speed is relatively low.

Furthermore with such a vehicle communication system, is only necessary for each of the individual ECUs (i.e., ECUs other than the supervisory ECU) of a network to operate based on control target values that are supplied from the supervisory ECU of the network. For example, the engine ECU would receive a target value of engine output torque from its supervisory ECU, and would then control various actuators such that the engine attains the specified value of output torque. Hence, each of the individual ECUs of a network can easily be developed for a specific application, without requiring to take into account the complexities of communication between that individual ECU and other ECUs of the same network or other networks. In that way, the invention enables complex control systems to be rapidly developed, and also enables any subsequent alterations of such a control system to be readily performed.

Alternatively stated, with a prior art type of vehicle communication system, it is always necessary to design each ECU by taking into consideration the other ECUs with which it will be required to communicate, and the type of data which will be transferred in that communication. That is, all of the various parameters relating to data communication must be considered when designing each ECU and in particular, when creating the various different control programs to be executed by respective ECUs of such a system. However with the present invention, such problems are substantially eliminated.

In addition, a vehicle communication system according to the present invention has the further advantage that data communication can readily be standardized. Hence, the contents of communication data will not readily be affected by changes in control specifications, etc.

Preferably, such a vehicle communication system includes at least a network for controlling the power train system of the vehicle (engine, transmission, etc.) and a network for controlling the vehicle motion system (brakes, steering, etc.), since control of these systems has become extremely complex in recent years, with the increased level of automated control of vehicle operation.

DESCRIPTION OF PREFERRED EMBODIMENT

Figure 1:
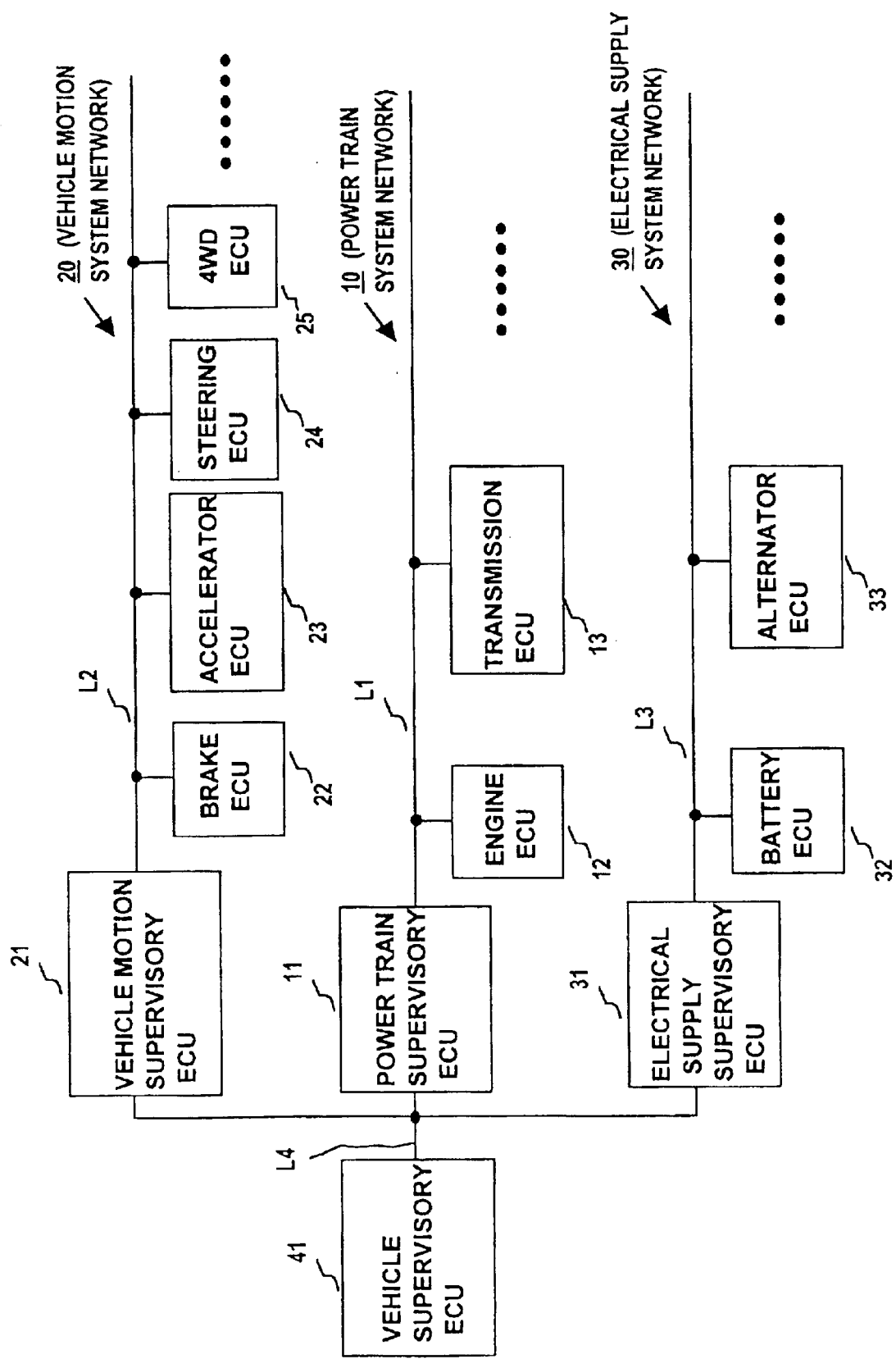
FIG. 1 is a system block diagram showing the configuration of an embodiment of a vehicle communication system according to the present invention.

FIG. 1 is a general system block diagram of an embodiment of a vehicle communication system according to the present invention. With this embodiment, respectively different ones of a plurality of networks (each containing a plurality of ECUs) are assigned to various basic systems of a vehicle. The term "basic system of a vehicle" as used in the following description and in the appended claims, signifies a set of controlled devices which in combination perform a basic vehicle function, such as the drive train system for producing the motive power of the vehicle (i.e., as performed by the engine and transmission), or the function of controlling the vehicle motion (i.e., as performed by the steering apparatus, the brakes, an adaptive cruise control apparatus, etc.,) and so on.

As shown in FIG. 1, the embodiment includes a power train system network 10 which controls the power train system of the vehicle, and is formed of an engine ECU 12 which controls the vehicle engine, a transmission ECU 13 which controls the automatic transmission of the vehicle, and a power train supervisory ECU 11 which outputs various control target values directed to the ECUs 12, 13 respectively, with the ECUs 11, 12, 13 being each connected to a communication line L1. The embodiment further includes a vehicle motion supervisory ECU 21 which controls the vehicle motion system, and is formed of a brake ECU 22 for controlling braking of the vehicle, an ACC (Adaptive Cruise Control) ECU 23 for controlling the vehicle such as to follow a preceding vehicle or to run at a specific fixed speed, a steering ECU 24 for controlling steering of the vehicle, a 4WD (4 Wheel Drive) ECU 25 for controlling the ratio in which motive power is distributed to the front and rear wheels of the vehicle, etc., and a vehicle motion supervisory ECU 21 which outputs various control target values and information directed to the ECUs 22, 23, 24, 25, etc., with the ECUs 21, 22, 23, 24, 25, etc., being each connected to a dedicated communication line L2. The embodiment also includes an electrical supply system network 30 which controls the electrical power supply system of the vehicle, and is formed of a battery ECU 32 which monitors the state of charge, etc., of the vehicle battery, an alternator ECU 33 which controls the vehicle alternator, and an electrical supply supervisory ECU 31 which produces various control target values directed to the ECUs 32, 33, etc., with the ECUs 31, 32, 33, etc., being each connected to a communication line L3.

In addition, each of the power train supervisory ECU 11, vehicle motion supervisory ECU 21 and electrical supply supervisory ECU 31 are mutually connected for data communication via a high-level communication line L4, which is separate from each of the dedicated communication lines L1, L2, L3 of the networks 10, 20, 30, and each of the supervisory ECUs 11, 21, 31 is also is connected to a vehicle supervisory ECU 41 via the high-level communication line L4.

Each of the ECUs incorporates a microprocessor and stored programs which are executed to control various equipment of the vehicle. The power train supervisory ECU 11 executes an algorithm for supervising the control operations which are performed by the engine ECU 12 and transmission ECU 13 of the power train system network 10, such as to coordinate the implementations of these control operations. The vehicle motion supervisory ECU 21 performs a similar function with respect to the vehicle motion system network 20, and the electrical supply supervisory ECU 31 performs a similar function with respect to the electrical supply system network 30. In addition, the vehicle supervisory ECU 41 performs a supervisory function for coordinating control of the overall vehicle.

Each of the supervisory ECUs 11, 21, 31 determines control target values which are to be supplied to the other ECUs of its own network, and transmits these control target values via the corresponding one of the communication lines L1, L2, L3. In the following, these other ECUs (e.g., the ECUs 22, 23, etc., in the vehicle motion system network 20, the ECUs 12, 13 in the power train system network 10, the ECUs 32, 33 in the electrical supply system network 30) will be referred to as the individual ECUs. Each of the supervisory ECUs 11, 21, 31 determines these control target values based upon information received from the individual ECUs of its local network via the communication line of that network, and also based on status information received via the higher-level communication line L4 from other ones of the supervisory ECUs 11, 21, 31, or on status information, and also on guidance values which are supplied from the vehicle supervisory ECU 41 and are derived based on control requests transmitted from other networks or upon the results of mediation between various control requests.

Each of the individual ECUs of a network, in addition to transmitting information such as control status information that is required by the supervisory ECU of that network, also performs control of equipment which is assigned to that individual ECU, such as to attain a control target value that has been received from the supervisory ECU of that network.

Figure 2:
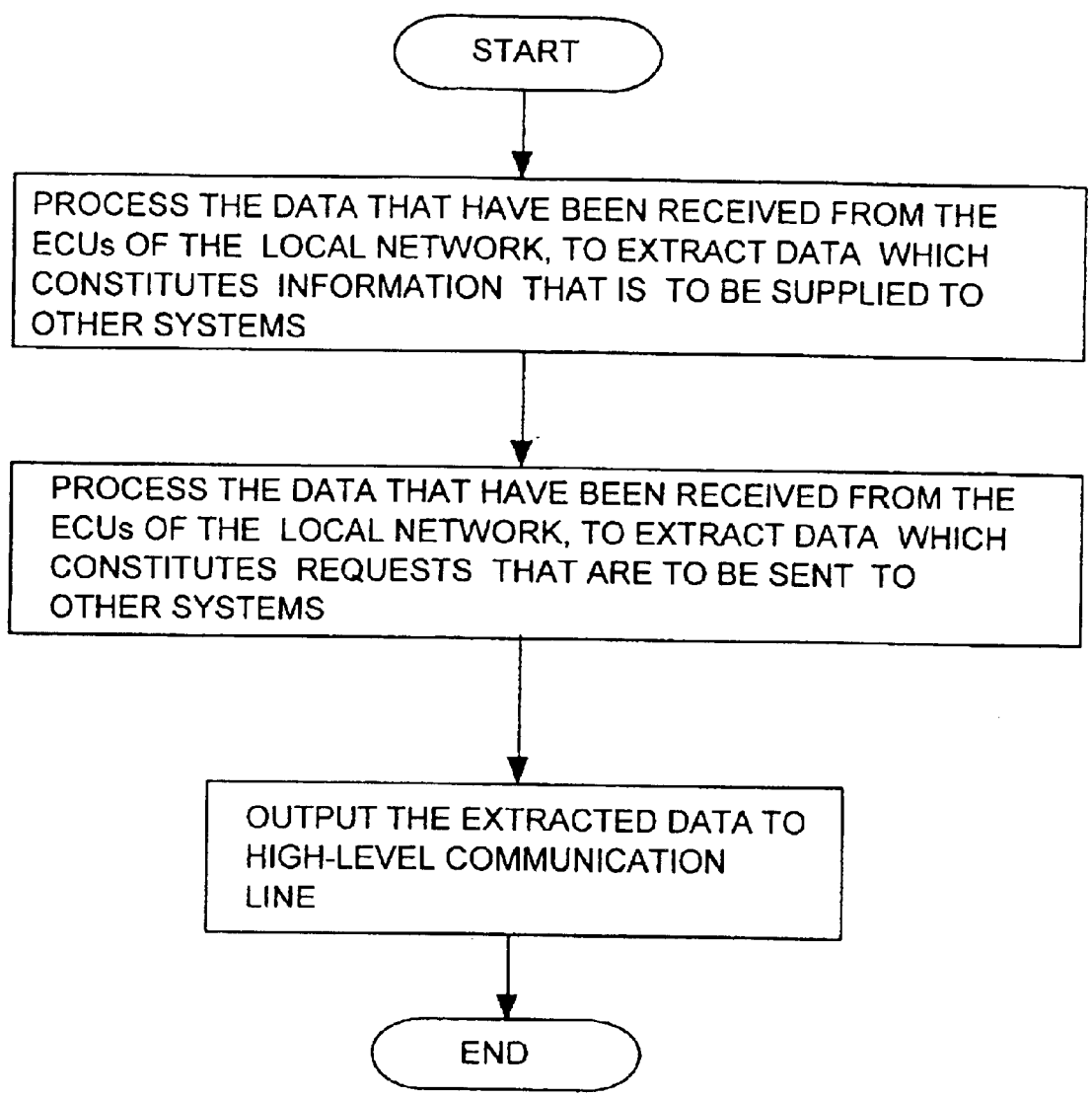
FIG. 2 is a basic flow diagram showing part of the operation which is performed by each of respective supervisory ECUs of the embodiment.

Each of the supervisory ECUs 11, 21, 31 executes a processing sequence for sending data (constituting information or control operation requests) to other supervisory ECUs that is basically of the form shown in the flow diagram of FIG. 2, at fixed periodic intervals. Firstly, the supervisory ECU extracts data constituting information which is to be transmitted to other networks, from the information that has been received from the individual ECUs of its local network via the communication line of that network (step S110). Next (step S120) the supervisory ECU performs internal processing of the information received from the individual ECUs of its local network, to select data constituting control requests that are to be transmitted to other networks. Finally in step S130, the sets of data which have been derived in steps S110, S120 are transmitted via the communication line of the network to the high-level communication line L4 and hence to the vehicle supervisory ECU 41 or to the supervisory ECUs of one or more other networks.

The determination of which data are to be extracted and transmitted, for example, can be based on a list which is stored in a non-volatile memory such as a ROM, etc.

The vehicle supervisory ECU 41 receives control requests from each of the supervisory ECUs 11, 21, 31, and also receives status information necessary for performing supervisory control from these supervisory ECUs 11, 21, 31, and, if necessary, performs mediation of the requests received from the supervisory ECUs to thereby derive guidance values which are transmitted to respective ones of the supervisory ECUs 11, 21, 31, to be used by each of these ECUs in calculating target values which are to be attained by the corresponding basic system of the vehicle. In the following, such guidance values which are transmitted from the vehicle supervisory ECU 41 will be referred to simply as "orders". However, orders which are transmitted from the vehicle supervisory ECU 41 to a lower-level supervisory ECU are values which are to be used by that lower-level supervisory ECU, in conjunction with other information, in deriving a target value. For example, a guidance value consisting of the amount of torque which is currently required by the alternator for electrical generation might be transmitted as an order to the power train supervisory ECU 11, to be used as a factor in calculating a target value of overall torque that is to be produced by the engine.

An order which is sent from a supervisory ECU to an individual ECU of the local network of that supervisory ECU, on the other hand, is a definite control target value which is to be achieved by the apparatus controlled by the individual ECU. This is possible, since the supervisory ECU is provided beforehand (i.e., stored in memory) with information concerning the range of control that can be actually implemented by each of the individual ECUs of its local network, as well as information concerning the current status of control being applied by these individual ECUs.

Figure 3:
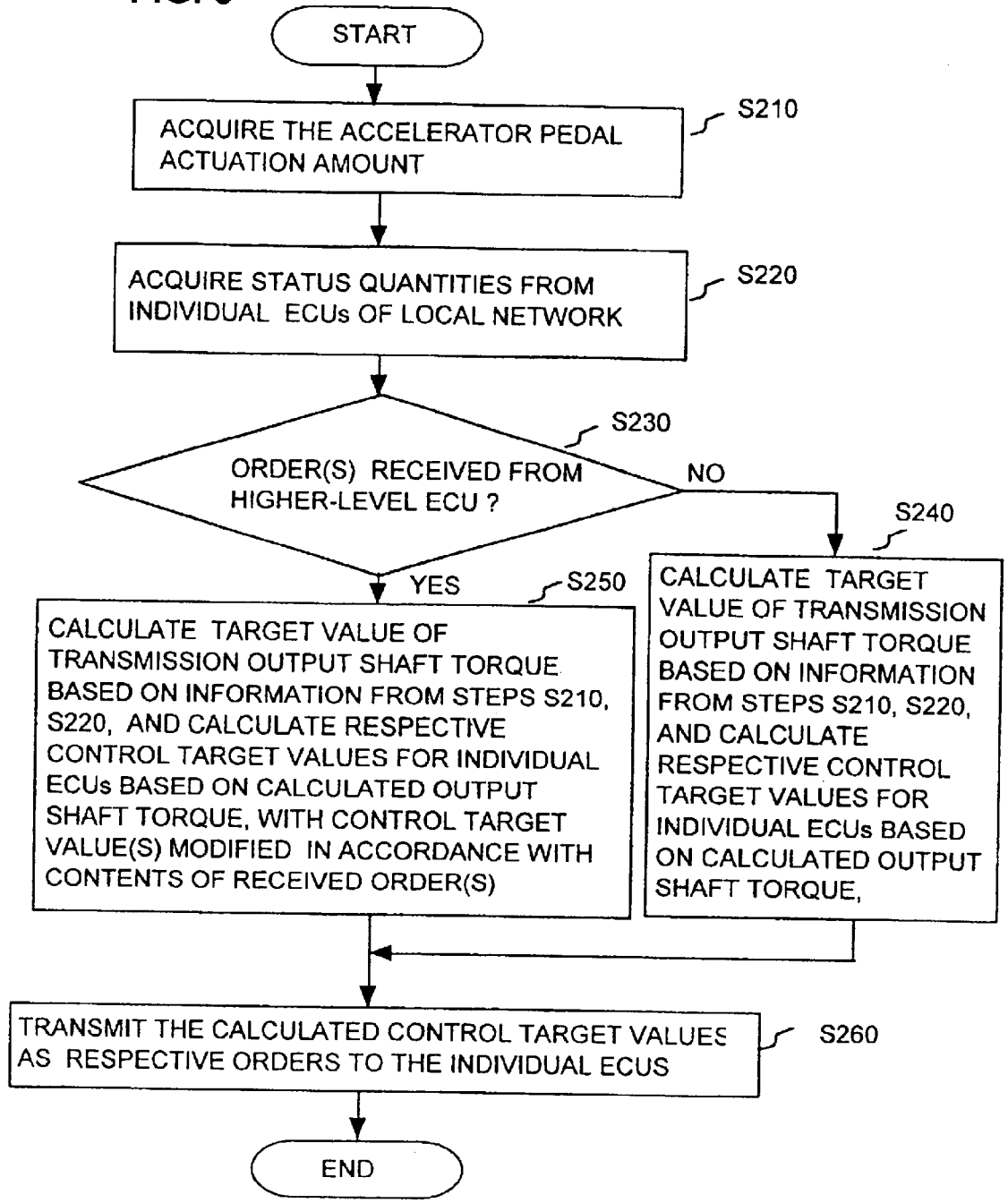
FIG. 3 is a basic flow diagram for describing the operation of a supervisory ECU of a power train system network.

The operation will be described in more specific detail in the following, referring to the flow diagram of FIG. 3 which illustrates the operation of the power train supervisory ECU 11 with respect to control of the transmission output shaft torque (the latter generally referred to in the following simply as the output shaft torque). Firstly, the power train supervisory ECU 11 acquires the amount of accelerator pedal actuation which is being applied by the vehicle driver, from an accelerator pedal sensor (not shown in the drawings) (step S210). In addition, the power train supervisory ECU 11 receives various status quantities via the communication line L1 from the engine ECU 12, transmission ECU 13, etc., of the power train system network 10, including the shift lever actuation position, the current speed of rotation of the engine, the engine cooling water temperature, the input and output rotation speeds of the transmission, etc (step S220). (It should be noted however that it would be possible for the power train supervisory ECU 11 to receive the accelerator pedal actuation amount as data which are transmitted from some other ECU, rather than being received directly from the accelerator pedal sensor).

Next, a decision is made as to whether or not any orders have been received from the vehicle supervisory ECU 41 (step S230). As described above, such an order might for example express an amount of engine torque that is currently required for driving the alternator (i.e., an amount of torque additional to that which the engine must apply to the input shaft of the vehicle transmission), with that torque amount being obtained by the vehicle supervisory ECU 41 based on a request that has been transmitted via the communication line L4 from the electrical supply supervisory ECU 31.

If no order has been received from the vehicle supervisory ECU 41, then (S240) the power train supervisory ECU 11 calculates a target value of output shaft torque based on the information obtained in steps S210, S220 as described above. The target value of output shaft torque may be calculated for example by using an algorithm which is designed to optimize various factors such as fuel consumption, exhaust gas emission levels, drive comfort, etc. That is to say, the power train supervisory ECU 11 calculates a target value of output shaft torque (to be produced from the vehicle transmission) such as to provide optimum operation of the overall drive train system of the vehicle If on the other hand it is found in step S230 that one or more orders have been received from the vehicle supervisory ECU 41 by the power train supervisory ECU 11, then operations are executed (step S250) in a manner that is basically similar to that of step S240. However in this case, assuming for example that the vehicle supervisory ECU 41 has transmitted to the power train supervisory ECU 11 (as an order) a value expressing the amount of engine torque currently required to drive the vehicle alternator, then the power train supervisory ECU 11 will accordingly modify the control target values that are to be supplied to the individual ECUs, e.g., increment the control target value of engine torque. That is to say, the control target values which are calculated by a supervisory ECU are modified, as appropriate, in accordance with the contents of any orders received from the vehicle supervisory ECU.

The various target values which have been thereby calculated in step S240 or step S250 are then transmitted as orders to the respective individual ECUs 12, 13, etc. of the power train system network 10 via the communication line L1 (step S260).

At this time, for example, the power train supervisory ECU 11 would send to the engine ECU 12 a control target value of engine torque, and send to the transmission ECU 13 a control target value of gear ratio.

Each of the control target values that are transmitted by a supervisory ECU such as the power train supervisory ECU 11 to the respective individual ECUs of its local network is determined based on control range information obtained from these ECUs beforehand and stored by the supervisory ECU, i.e., information which expresses ranges of values, that can actually be attained through control operations performed by the respective individual ECUs. In that way it is ensured that each of the control target values which is calculated by the supervisory ECU of a network will be within a range of actually attainable values.

In the case of the engine ECU 12 for example, this ECU responds to receiving a target value of engine output torque from the power train supervisory ECU 11 by calculating values which include the necessary air intake flow rate, fuel injection quantities, ignition timing, etc., i.e., quantities which are required for attaining the specified target value of torque. The engine ECU 12 then applies these respective values in controlling the actuators of corresponding devices such as the fuel injectors, igniters, etc. In addition, the engine ECU 12 utilizes signals received from various sensors (not shown in the drawings) including the crankshaft angle sensor, engine water temperature sensor, etc., which are connected to the engine ECU 12, for thereby obtaining information such as the current engine speed of rotation, the crankshaft torque (that is, the actual engine output torque), the engine cooling water temperature, etc., i.e., status information which is required for the power train supervisory ECU 11 to calculate control quantities, and transmits this status information via the communication line L1 to the power train supervisory ECU 11.

The vehicle motion supervisory ECU 21 acquires the accelerator pedal actuation amount from the power train supervisory ECU 11, via the communication line L4, and also acquires information consisting of physical values relating to the current state of vehicle motion, such as the amount of actuation of the brake pedal, the steering angle, the actual degree of vehicle acceleration in the forward or reverse direction, the actual degree of lateral acceleration, the actual yaw rate, the rotation speeds of the road wheels, etc., with such information being obtained from respective ECUs 22, 23, etc., of the vehicle motion system network 20 via the communication line L2. Based on this information, the vehicle motion supervisory ECU 21 calculates target values for the vehicle acceleration in the forward or reverse direction, the lateral acceleration, the yaw rate, the degree of tire grip on the road surface, etc., i.e., target values for quantities which relate to vehicle motion.

Based on these target values relating to vehicle motion, the vehicle motion supervisory ECU 21 calculates respective orders which are to be transmitted to each of the ECUs 22, 23, etc., of the vehicle motion system network 20 via the communication line L2. That is to say, the vehicle motion supervisory ECU 21 calculates orders which, when implemented by the respective ECUs 22, 23, etc., will result in the target values relating to vehicle motion being attained. For example, a control target value of braking force is sent to the brake ECU 22 as an order, and a control target value for the ratio of distribution of drive power to the front and rear road wheels is sent as an order to the 4WD ECU 25.

At the same time, the vehicle motion supervisory ECU 21 calculates a value of transmission output shaft torque which is required for achieving the calculated target values for vehicle motion, and transmits that value of output shaft torque (as a control request value) to the vehicle supervisory ECU 41.

The electrical supply supervisory ECU 31 on the other hand acquires information concerning the state of charge of the vehicle battery from the battery ECU 32 via the communication line L3, and also acquires information specifying the range of electrical power that can currently be generated by the alternator from the alternator ECU 33 via the communication line L3. In addition, the electrical supply supervisory ECU 31 acquires information specifying the overall amount of electrical power currently required by the power train system of the vehicle, and the overall amount of electrical power currently required by the vehicle motion system, with that information being received (as respective orders, as described above) from the vehicle supervisory ECU 41 via the communication line L4.

The electrical supply supervisory ECU 31 uses the received information to calculate a target value for the amount of electrical power that is to be generated by the alternator, such as to enable the battery to be maintained at an appropriate level of charge, or such as to cause the state of charge of the battery to move to an appropriate level. The target value of electrical power to be generated is then transmitted as an order to the alternator ECU 33, via the communication line L3. The overall amounts of power consumption of the power train system and vehicle motion system are calculated by the power train supervisory ECU 11 and the vehicle motion supervisory ECU 21 respectively, and transmitted to the vehicle supervisory ECU 41. However these values of electrical power consumption could, as an alternative, be transmitted directly from the power train supervisory ECU 11 and from the vehicle motion supervisory ECU 21 to the electrical supply supervisory ECU 31, without passing through the vehicle supervisory ECU 41.

At the same time, the electrical supply supervisory ECU 31 calculates the amount of transmission output shaft torque that will be consumed by the electrical supply system (mainly by the alternator), based upon the target value of electrical power generation for the alternator. The calculated transmission output shaft torque value is then transmitted to the vehicle supervisory ECU 41, as a control request value.

The vehicle supervisory ECU 41 thereby calculates a value of transmission output shaft torque that is required to satisfy the requirements of the vehicle motion system, and a value of engine output torque that is required to drive the alternator, based on control request values received from the vehicle motion supervisory ECU 21 and from the electrical supply supervisory ECU 31, etc. These values are then transmitted as orders to the power train supervisory ECU 11, via the communication line 14.

When this occurs, the power train supervisory ECU 11 performs the processing described above referring to steps S250, S260 in FIG. 3, whereby appropriate target values of engine output torque and of gear ratio, etc., are calculated and transmitted as orders to the individual ECUs 12, 13, etc., of the power train system network 10.

Thus as can be understood from the above description, with this embodiment of a vehicle communication system, respective networks each formed of a plurality of ECUs connected to a communication line are provided for respective basic systems of a vehicle, including the power train system, the vehicle motion system, etc., with each of these networks being provided with a supervisory ECU such as the ECUs 11, 21 and 31. Each of the supervisory ECUs acquires information from the individual ECUs of its own network, and in addition also acquires information via a higher-level communication line (e.g., the communication line L4). Based on the acquired information, each supervisory ECU calculates orders that are to be directed to respective individual ECUs of its local network, and transmits these orders to the individual ECUs. The individual ECUs operate on the basis of these orders, so that supervised control of the functions performed by the systems of the vehicle is achieved.

Hence, it becomes unnecessary for the ECUs within the respective networks to handle excessively large amounts of data. Instead, only a relatively small amount of data need be exchanged between the ECUs within the various networks.

Figure 4:
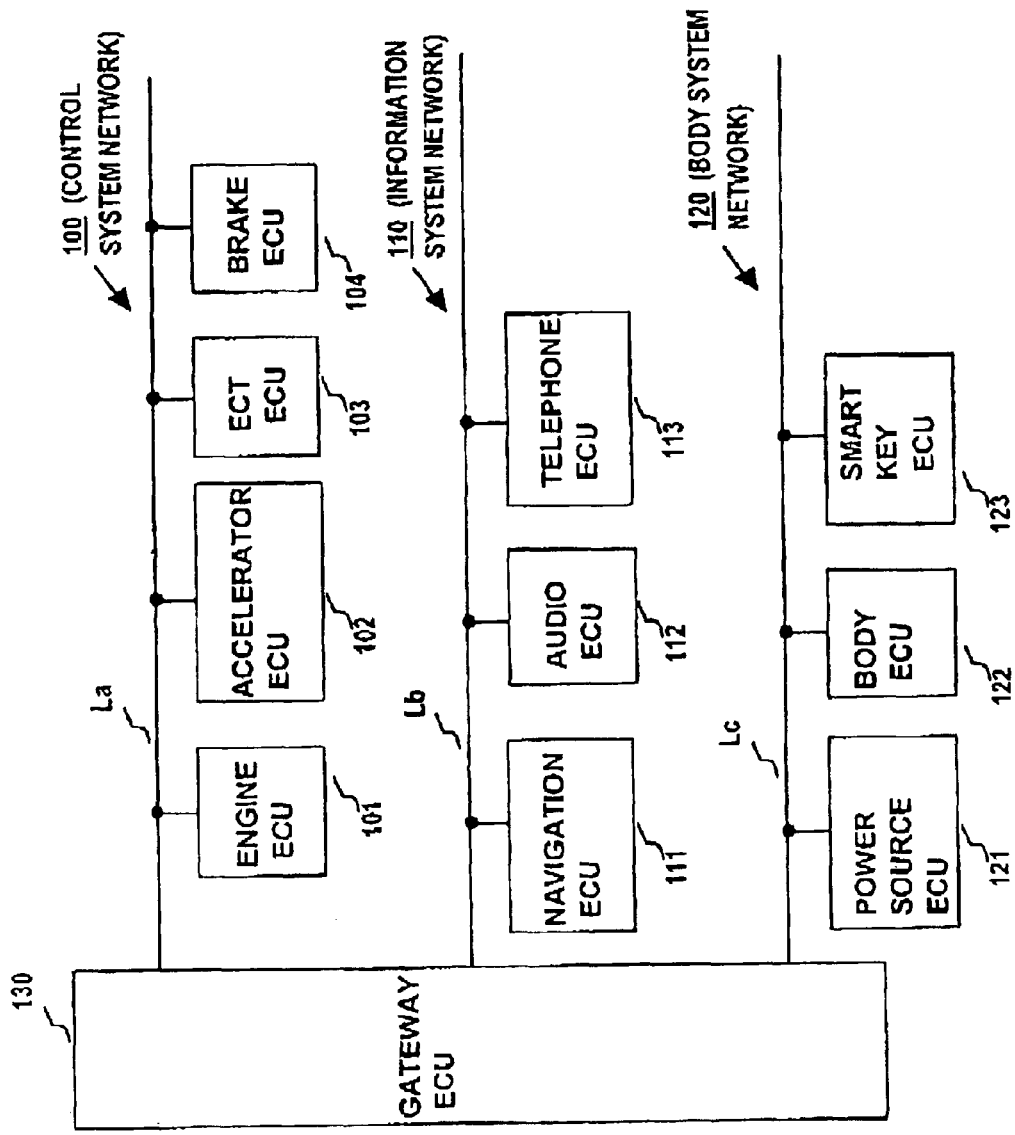
FIG. 4 is a system block diagram showing the configuration of an example of a prior art type of vehicle communication system.

Considering the prior art example of FIG. 4 however, in order to achieve smooth control of the engine and the automatic transmission, it is necessary as described hereinabove to transmit engine control information from the engine ECU 101 to the ECT ECU 103. Such engine control information includes for example the throttle degree of opening, reference value of engine torque, estimated value of predicted engine torque, estimated value of current engine torque, ignition timing, information specifying whether fuel cut-off is occurring, engine rotation speed for recovery from fuel cut-off, predicted duration of fuel cut-off, air conditioner on/off information, etc. Thus, very large amounts of information must be transmitted. Similarly the ECT ECU 103 must transmit to the engine ECU 101 as AT (automatic transmission) control information such items as a maximum speed inhibit request, reverse inhibit flag, gear shift position signal, R range contact flag, NDR speed change termination information, solenoid output duty ratio, lock-up ON/OFF judgement information, etc., i.e., here again very large amounts of information must be transmitted.

However with the embodiment of the present invention described above, it is only necessary for the engine ECU 12 to transmit to the power train supervisory ECU 11 (as engine status information) information such as the current engine torque, minimum and maximum values of engine torque, minimum and maximum values of engine rotation speed, etc. Furthermore, it is only necessary for the transmission ECU 13 to transmit to the power train supervisory ECU 11 (as AT control information) items such as the current gear ratio, the shift level actuation position, and the lock-up status.

Furthermore with the above embodiment, when information is transmitted from one network to another (i.e., is transferred between two different supervisory ECUs), only the information which actually is required to be transmitted is selected by the transmitting supervisory ECU (as shown in steps S110, S120 of FIG. 2) from various information which has been received by that supervisory ECU from the individual ECUs of its local network. In that way, the exchange of data between the different networks is optimized, so that the total amount of data that are transferred can be substantially reduced by comparison with a prior art system.

Hence, the amount of data that is handled overall by the vehicle communication system is greatly reduced by comparison with the prior art, so that satisfactory control of the vehicle functions can be achieved even if the data communication speed is relatively low.

Furthermore with the above embodiment, due to the fact that each of the individual ECUs can operate in accordance with orders that are received from the supervisory ECU of their local network, each of the individual ECUs can be easily developed to perform specialized functions. Thus, complex control systems which function in a mutually linked manner can be developed within a short period of time, and in addition, modifications to such control systems can be readily performed. In addition, the amount of design work which is involved in the development of such control systems can be reduced, while improved quality can be expected.

Moreover the communication data can readily be standardized, since changes in the control specifications etc., will not readily affect the contents of the communication data. In particular with the above embodiment, data communication is performed in an order/request manner, whereby a low-level ECU transmits control requests to a higher-level ECU, and the higher-level ECU responds by transmitting respective orders (i.e., control target values or guidance values) to one or more lower-level ECUs. As a result, data communication between the ECUs can easily be standardized, and due to such standardization, a complex control system can be readily developed in a short period of time.

It should be noted that for example, a body system network could be added to the vehicle communication system of FIG. 1. In that case, the body system network could consist of a door ECU for controlling locking and unlocking of the vehicle doors, a window open/close ECU controlling opening and closing of power windows, and a body supervisory ECU for supplying orders to these individual ECUs, with all of these ECUs connected to a dedicated communication line. Orders for specifying door lock or unlock would be transmitted from the body supervisory ECU to the door open/close ECU, while orders specifying opening or closing of the power windows would be transmitted to the window open/close ECU. In that way two functions, i.e., locking and unlocking of the vehicle doors and control of opening and closing of the power windows, could be implemented by a single network.

It would be possible to separate the networks in accordance with respectively different sets of vehicle system functions from those of the embodiment described above. However in recent years, control of the power train system and of the vehicle motion system have become extremely complex and important. In order to implement these functions with a prior art type of vehicle communication system, it is necessary for very large amounts of data to be exchanged between ECUs, with a high speed of data communication. For that reason, it is preferable to provide (as with the above embodiment) at least the network 10 for controlling the power train system and the network 20 for controlling the vehicle motion, as respectively separate networks.

Furthermore although an embodiment has been described above by utilizing very simple examples of information and orders which are transferred between the vehicle supervisory ECU and the supervisory ECUs of respective networks, it will be apparent that in practice, the vehicle supervisory ECU can readily be programmed to perform complex mediation between requests that are transmitted by the various supervisory ECUs of the networks (i.e., mediation between control requests whose requirements may mutually conflict) and to transmit appropriate orders to the lower-level supervisory ECUs based on the results of such mediation.

Moreover although the above embodiment has been described for the case of incorporating a vehicle supervisory ECU which communicates with the various supervisory ECUs of the networks, it would be possible to implement such a system without incorporating a vehicle supervisory ECU, i.e., with control requests and information being exchanged between the supervisory ECUs of the respective networks, and that such a system would fall within the scope claimed for the present invention.

It can thus be understood that although the invention has been described in the above referring to a specific embodiment, various modifications to the embodiment could be envisaged.

What is claimed is:

1. A vehicle communication system in which one or more basic systems of a vehicle are provided with respectively corresponding data communication networks, each said network comprising a plurality of electronic control apparatuses linked by a communication line which is dedicated to said each network, wherein one of said electronic control apparatuses of said each network is adapted to operate as a supervisory control apparatus, said supervisory control apparatus performing supervisory control of other electronic control apparatuses of the network in which said supervisory control apparatus is connected, by transmitting information and control target values to said other electronic control apparatuses of said network, and respective supervisory control apparatuses of said networks are connected for mutual data communication via a high-level communication line which is separate from each of said dedicated communication lines of said networks, and wherein said supervisory control apparatus of said each network receives information from said other electronic control apparatuses of its network via the dedicated communication line of that network, and further receives information via said high-level communication line, and derives said information and control target values to be transmitted to said other electronic control apparatuses based upon said information received via said high-level communication line and upon internal processing of received information which is performed by said supervisory control apparatus itself.

2. A vehicle control apparatus according to claim 1, comprising an electronic control apparatus connected to said high-level communication line, adapted to function as a vehicle supervisory control apparatus for coordinating respective operations of said basic systems of said vehicle, wherein each of said supervisory control apparatuses of said networks transmits to said vehicle supervisory control apparatus information relating to the operating status of said network and information constituting requests for control quantities to be implemented by other ones of said networks, and wherein said vehicle supervisory control apparatus executes processing to mediate between said requests, based on said information relating to operating status, and transmits to said supervisory control apparatuses of said networks information constituting guidance objectives for control target values to be generated by said supervisory control apparatuses, said guidance objectives being derived based upon results of said mediation.

3. A vehicle control apparatus according to claim 2, wherein each of said supervisory control apparatuses of said networks is adapted to process information received from said other electronic control apparatuses of its network, for selecting therefrom status information which is to be transmitted via said high-level communication line to said vehicle supervisory control apparatus or to respective supervisory control apparatuses of other ones of said networks, and information constituting requests for control operations, which are to be transmitted via said high-level communication line to said vehicle supervisory control apparatus.

4. A vehicle control apparatus according to claim 1, wherein said networks comprise at least a network for controlling a power train system of said vehicle and a network for controlling a vehicle motion system of said vehicle.

* * * * *